(12) United States Patent
Saito et al.

(10) Patent No.: US 9,574,775 B2
(45) Date of Patent: Feb. 21, 2017

(54) COOLING UNIT FOR SWILRER VANE OF COMBUSTION BURNER

(71) Applicant: MITSUBISHI HEAVY INDUSTRIES, LTD., Tokyo (JP)

(72) Inventors: Toshihiko Saito, Hyogo (JP); Koichi Ishizaka, Hyogo (JP); Satoshi Tanimura, Hyogo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 247 days.

(21) Appl. No.: 14/340,210

(22) Filed: Jul. 24, 2014

(65) Prior Publication Data

US 2014/0331679 A1 Nov. 13, 2014

Related U.S. Application Data

(62) Division of application No. 12/743,315, filed as application No. PCT/JP2008/069762 on Oct. 30, 2008, now Pat. No. 8,820,047.

(30) Foreign Application Priority Data

Nov. 29, 2007 (JP) ................................ 2007-308603

(51) Int. Cl.
*F23R 3/28* (2006.01)
*F23R 3/14* (2006.01)
(Continued)

(52) U.S. Cl.
CPC .............. *F23R 3/283* (2013.01); *F02C 7/22* (2013.01); *F23R 3/14* (2013.01); *F23R 3/38* (2013.01);
(Continued)

(58) Field of Classification Search
CPC .............. F23R 3/283; F23R 3/14; F23R 3/38; F23R 2900/00004; F02C 7/22; Y02T 50/675
(Continued)

(56) References Cited

U.S. PATENT DOCUMENTS

| 4,327,547 A | 5/1982 | Hughes et al. |
| 4,955,191 A | 9/1990 | Okamoto et al. |

(Continued)

OTHER PUBLICATIONS

Non-Final Office Action dated Jun. 10, 2016, issued in U.S. Appl. No. 14/340,274. (13 pages).

(Continued)

*Primary Examiner* — Steven Sutherland
(74) *Attorney, Agent, or Firm* — Westerman, Hattori, Daniels & Adrian, LLP

(57) ABSTRACT

A combustion burner including a fuel nozzle, a burner tube that surrounds the fuel nozzle to form an air passage between the burner tube and the fuel nozzle, swirler vanes that are arranged in a circumferential direction on an external circumferential surface of the fuel nozzle, a liquid fuel injecting hole that is formed on the fuel nozzle, and from which a liquid fuel is injected to a vane pressure surface of each of the swirler vanes, and a cooling unit that cools a part of the vane pressure surface on which the liquid fuel hits. The cooling unit includes a multi-purpose injecting hole that is arranged on the vane pressure surface of each of the swirler vanes, and from which a gas fuel is injected during gas combustion, and water is injected to the vane pressure surface of the swirler vane during combustion of the liquid fuel.

1 Claim, 10 Drawing Sheets

(51) Int. Cl.
*F02C 7/22* (2006.01)
*F23R 3/38* (2006.01)

(52) U.S. Cl.
CPC ..... *F23R 2900/00004* (2013.01); *Y02T 50/675* (2013.01)

(58) Field of Classification Search
USPC .............. 60/39.463, 39.55, 737, 748, 39.26, 39.3,60/39.53; 239/399, 400
See application file for complete search history.

(56) References Cited

U.S. PATENT DOCUMENTS

| | | | |
|---|---|---|---|
| 5,165,241 A | 11/1992 | Joshi et al. | |
| 5,317,861 A | 6/1994 | Fox et al. | |
| 5,794,449 A | 8/1998 | Razdan et al. | |
| 5,822,922 A | 10/1998 | Grumm et al. | |
| 5,822,992 A | 10/1998 | Dean | |
| 6,250,065 B1 | 6/2001 | Mandai et al. | |
| 6,722,132 B2 | 4/2004 | Stuttaford et al. | |
| 6,915,636 B2 | 7/2005 | Stuttaford et al. | |
| 6,993,916 B2 | 2/2006 | Johnson et al. | |
| 7,143,583 B2 | 12/2006 | Hayashi et al. | |
| 7,908,864 B2 | 3/2011 | Haynes et al. | |
| 2004/0050056 A1 | 3/2004 | Pederson et al. | |
| 2004/0050061 A1 | 3/2004 | Schmotolocha et al. | |
| 2004/0050063 A1 | 3/2004 | Schmotolocha et al. | |
| 2005/0081508 A1 | 4/2005 | Edelman et al. | |
| 2005/0178104 A1 | 8/2005 | Schmotolocha et al. | |
| 2005/0193741 A1 | 9/2005 | Iasillo et al. | |
| 2006/0230764 A1 | 10/2006 | Schmotolocha et al. | |
| 2007/0130954 A1 | 6/2007 | Lynch et al. | |
| 2008/0267783 A1* | 10/2008 | Kraemer | F23R 3/14 416/90 R |

OTHER PUBLICATIONS

Non-Final Office Action dated Jul. 7, 2016, issued in U.S. Appl. No. 14/340,245. (16 pages).
U.S. Notice of Allowance dated Oct. 28, 2016, issued in U.S. Appl. No. 14/340,245 (11 pages).
U.S. Notice of Allowance dated Sep. 27, 2016, issued in U.S. Appl. No. 14/340,274 (11 pages).

* cited by examiner

FIG.8
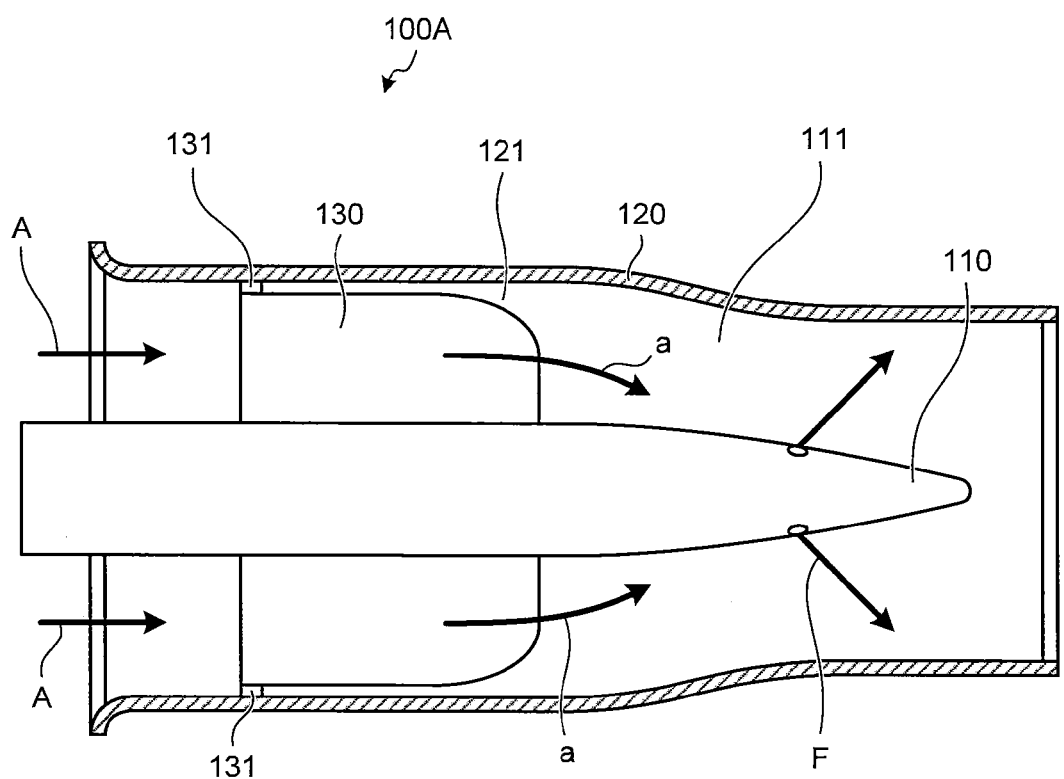
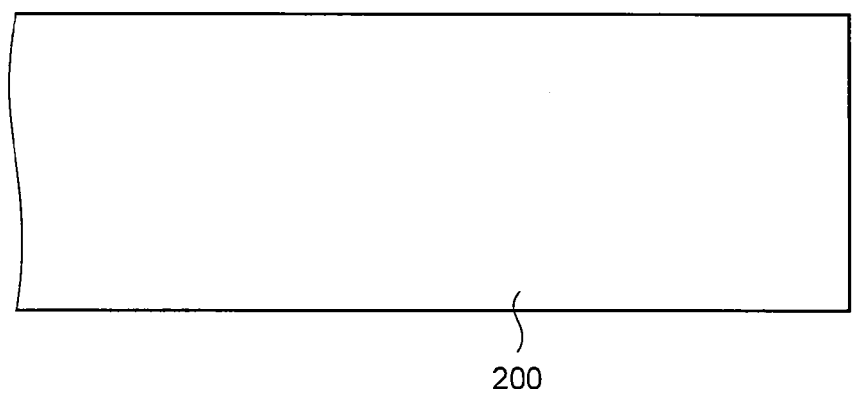

COOLING UNIT FOR SWILRER VANE OF COMBUSTION BURNER

CROSS-REFERENCE TO RELATED APPLICATIONS

This application is a Divisional of U.S. patent application Ser. No. 12/743,315, filed May 17, 2010, and wherein application Ser. No. 12/743,315 is a national stage application filed under 35 USC §371 of International Application No. PCT/JP2008/069762, filed Oct. 30, 2008, and which is based upon and claims the benefit of priority from the prior Japanese Patent Application No. 2007-308603, filed on Nov. 29, 2007, which are hereby incorporated by reference in their entirety.

TECHNICAL FIELD

The present invention relates to a combustion burner that uses either only a liquid fuel, or both of a liquid fuel and a gas fuel, as a fuel.

BACKGROUND ART

A gas turbine, such as one used for generating power, includes, as its main components, a compressor, a combustor, and a turbine. Many gas turbines have a plurality of combustors, and the combustors included in the gas turbine are arranged in a circle in a combustor casing. Air compressed by the compressor is mixed with fuel supplied into the combustors, and is combusted. Such combustion takes place in each of the combustors to generate high temperature combustion gas. The combustion gas, produced by the combustion, is supplied to the turbine to drive the turbine in rotation.

FIG. 8 indicates an exemplary structure of a combustion burner included in a combustor of a conventional gas turbine. As shown in FIG. 8, this combustion burner 100A is arranged in plurality (in FIG. 8, only one is depicted), surrounding a pilot combustion burner 200. A pilot combustion nozzle, not shown, is installed in the pilot combustion burner 200. The combustion burner 100A and the pilot combustion burner 200 are arranged in a combustion liner of the gas turbine. The combustion burner 100A includes, as main component thereof, a fuel nozzle 110, a burner tube 120, and swirler vanes (swirler vane) 130 (Patent Documents 1 and 2).

The burner tube 120 is arranged along the same axis as the fuel nozzle 110, surrounding the fuel nozzle 110, to provide a ring-like air passage 111 between the external circumferential surface of the fuel nozzle 110 and the inner circumferential surface of the burner tube 120. Compressed air A flows through the air passage 111 from upstream (from the left-hand side in FIG. 8) to downstream of the air passage 111 (toward the right-hand side in FIG. 8). The swirler vanes 130 are arranged in a plurality of positions along the circumferential direction of the fuel nozzle 110, each extending in the axial direction of the fuel nozzle 110. A clearance (gap) 121 is kept between the tip (tip) of the external circumference of each of the swirler vanes 130 and the inner circumferential surface of the burner tube 120, generating a leaking air flow that flows around a vane pressure surface of each of the swirler vanes 130 to a vane suction surface thereof. This leaking flow interferes with the compressed air A to generate a vortical air flow. By way of such a vortical air flow, the compressed air A is effectively mixed with vaporized and atomized fuel F injected from a point near the tip of the fuel nozzle 110 to the vane surface. In this manner, even distribution of the fuel is promoted. The reference numeral 131 in FIG. 8 indicates a clearance setting rib.

The gas turbine uses not only a gas fuel but also a liquid fuel as a fuel. Conventionally, when a liquid fuel is used, the liquid fuel is injected through a liquid fuel injecting hole toward the flow of the compressed air. In this manner, the injected liquid fuel is sheared by the compressed air flow, and becomes atomized and mixed with air. The liquid fuel that is atomized and mixed with air is then combusted.

Examples of liquid fuels include, the bunker A, light oil, and dimethyl ether that are so-called oil fuel.

When a liquid fuel is used in the conventional combustion burner 100A, the liquid fuel is supplied from the point near the tip of the fuel nozzle 110, and each of the swirler vanes 130 gives a swirling force to the compressed air A that is flowing through the air passage 111 to obtain a swirling air flow a. The kinetic momentum of the swirler air is used to atomize the liquid fuel, and to reduce $NO_x$ and suppress soot.

However, the conventional combustion burner 100A, such as the one shown in FIG. 8, has been limited in its capability to atomize the liquid fuel. Furthermore, it has been extremely difficult to make the fuel density uniform in the fuel nozzle 110.

To prevent these problems, a combustion burner has been suggested to promote atomization and to make the fuel density uniform. FIG. 9 is a schematic of an exemplary structure of another conventional combustion burner. FIG. 10 is a perspective view of the fuel nozzle included in the conventional combustion burner. As shown in FIGS. 9 and 10, this conventional combustion burner 100B supplies a liquid fuel LF through liquid fuel injecting holes 133A arranged on the surface of the fuel nozzle 110. The liquid fuel LF, injected through the liquid fuel injecting holes 133A, is injected toward the vane pressure surface 132a of the swirler vane 130. On the vane pressure surface 132a, the liquid fuel LF spreads out into a thin film. The liquid fuel LF that is spread into a thin film is sheared by a high-speed air flow, to become atomized and vaporized. In this manner, atomization is promoted, and uniform fuel density is achieved (Patent Document 3).

[Patent Document 1] Japanese Patent Application Laid-open No. H11-14055

[Patent Document 2] Japanese Patent Application Laid-open No. 2004-12039

[Patent Document 3] Japanese Patent Application Laid-open No. 2006-336997

DISCLOSURE OF INVENTION

Problem to be Solved by the Invention

However, in the combustion burner 100B, the temperature of the compressed air A becomes relatively high, e.g., approximately 450 Celsius degrees, while using the liquid fuel LF. If the vane pressure surface 132a of the swirler vane 130 heated to high temperature by the compressed air A is brought in contact with the liquid fuel LF, carbon deposit can be produced.

In consideration of the problems above, an object of the present invention is to provide a combustion burner that can suppress formation of carbon deposit on a part of a swirler vane surface on which a liquid fuel hits.

Means for Solving Problem

According to an aspect of the present invention, a combustion burner includes: a fuel nozzle; a burner tube that surrounds the fuel nozzle to form an air passage between the burner tube and the fuel nozzle; a plurality of swirler vanes being arranged in a plurality of positions in a circumferential direction on an external circumferential surface of the fuel nozzle, each of which extends along an axial direction of the fuel nozzle, and gradually curves from upstream to downstream so as to swirl air flowing in the air passage from the upstream to the downstream; a liquid fuel injecting hole that is formed on the fuel nozzle, and from which a liquid fuel is injected to a vane surface of each of the swirler vanes; and a cooling unit that cools a part of the vane surface on which the liquid fuel hits.

Advantageously, in the combustion burner, the cooling unit includes a multi-purpose injecting hole that is arranged on a vane pressure surface of each of the swirler vanes, and from which a gas fuel is injected during gas combustion, and water is injected to the vane pressure surface of the swirler vane during combustion of the liquid fuel.

Advantageously, in the combustion burner, the cooling unit includes a water injecting hole that is arranged upstream of the liquid fuel injecting hole provided on the fuel nozzle, and in line therewith, and from which water is injected to the vane pressure surface of the swirler vane.

Advantageously, in the combustion burner, the cooling unit injects a mixed fuel prepared by mixing water and the liquid fuel evenly from the liquid fuel injecting hole to the vane pressure surface of the swirler vane.

Advantageously, in the combustion burner, the cooling unit includes a water cooling circuit formed inside the swirler vane.

Advantageously, in the combustion burner, the liquid fuel injecting hole is arranged on a vane pressure surface of the swirler vane, and the cooling unit includes a water injecting hole that is arranged upstream of the liquid fuel injecting hole on the vane pressure surface, and from which water is injected to the vane pressure surface of the swirler vane.

Advantageously, in the combustion burner, the liquid fuel injects the liquid fuel to any one of the vane pressure surface and a vane suction surface of the swirler vane or both of them.

Effect of the Invention

According to the present invention, because the combustion burner includes the cooling unit that cools the part of the swirler vane surface on which the liquid fuel hits, it is possible to prevent the part of the swirler vane surface on which the liquid fuel hits from being heated up, to prevent formation of carbon deposit.

Furthermore, because the combustion burner includes, as the cooling unit, a multi-purpose injecting hole arranged on the vane pressure surface of the swirler vane for injecting a gas fuel during gas combustion, and injecting water during liquid fuel combustion to the vane pressure surface of the swirler vane, a water film can be formed on the vane surface on the vane pressure surface to cool the part of the vane surface on which the liquid fuel hits. In this manner, a combustion temperature can be reduced, and formation of carbon deposit can be prevented. Furthermore, $NO_x$ in the combustion field can also be reduced.

Furthermore, because the combustion burner includes, as the cooling unit, the water injecting hole that is arranged upstream of the liquid fuel injecting hole provided on the fuel nozzle and in line therewith, and from which water is injected to the vane pressure surface of the swirler vane, a water film can be formed on the vane pressure surface of the swirler vane to cool the part of the swirler vane surface on which the liquid fuel hits. In this manner, a combustion temperature can be reduced, and formation of carbon deposit can be prevented.

Furthermore, because the combustion burner includes the cooling unit that injects mixed fuel prepared by mixing water and the liquid fuel evenly through the liquid fuel injecting hole to the vane pressure surface of the swirler vane, the water becomes vaporized first to reduce the combustion temperature, and to deprive temperature from the surface of the swirler vane. Therefore, formation of carbon deposit can be prevented.

Furthermore, because the combustion burner includes, as the cooling unit, the water cooling circuit formed inside the swirler vane, the temperature on the surface of the swirler vane can be reduced, to cool the part of the vane surface on which the liquid fuel hits, and to suppress the swirler vane from being heated up. In this manner, formation of carbon deposit can be prevented more effectively.

Furthermore, because the combustion burner includes, as the cooling units, the liquid fuel injecting hole arranged on the vane pressure surface of the swirler vane, and a water injecting hole that is arranged upstream of the liquid fuel injecting hole that is arranged on the vane pressure surface of the swirler vane to inject water to the vane pressure surface of the swirler vane, a water film can be formed on the vane pressure surface of the swirler vane to reduce the temperature of the vane pressure surface of the swirler vane. In this manner, formation of carbon deposit can be prevented.

BRIEF DESCRIPTION OF DRAWINGS

FIG. 8 is a schematic of an exemplary structure of a combustion burner included in a combustor of a conventional gas turbine.

Figure 1:
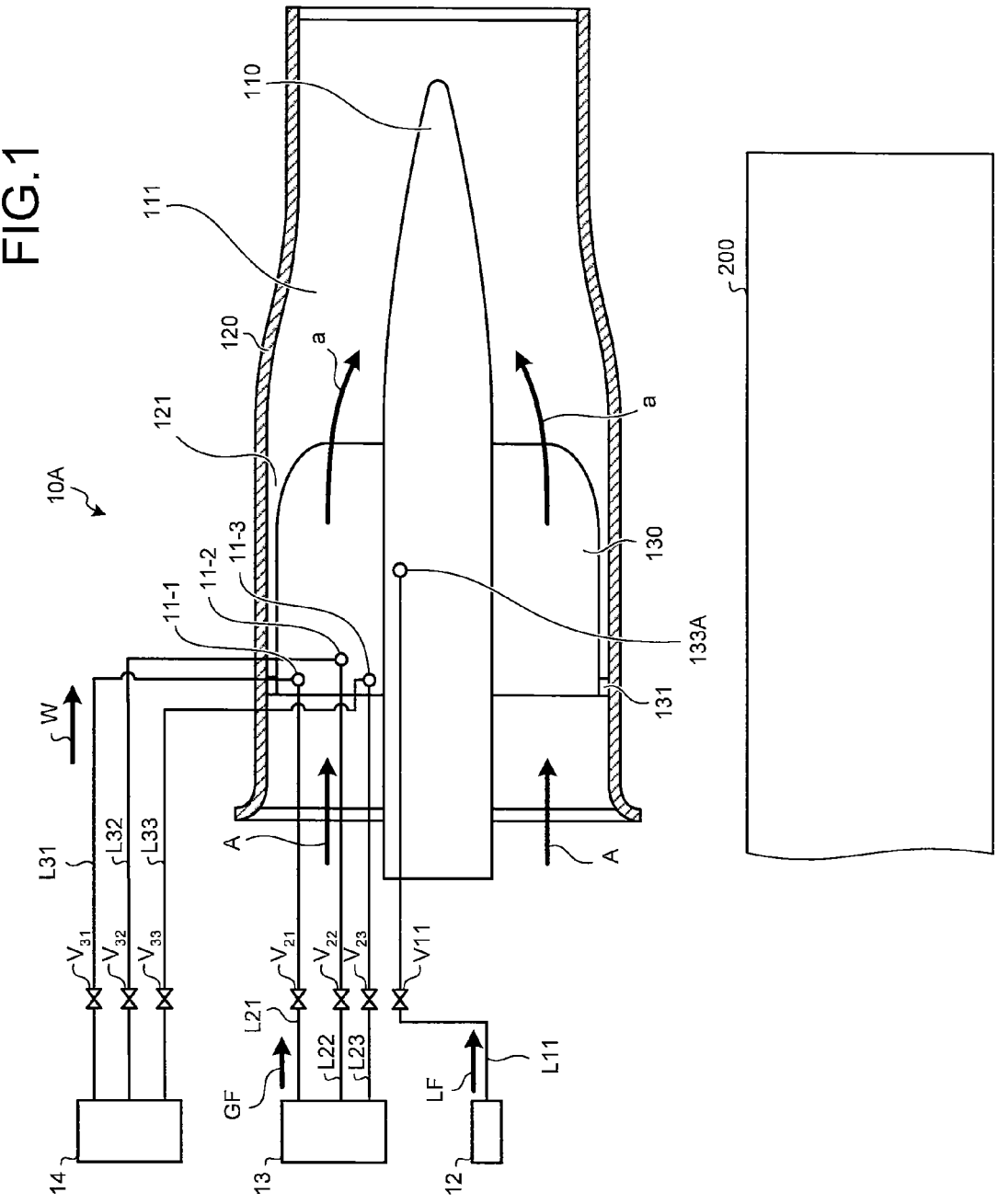
FIG. 1 is a schematic of a structure of a combustion burner according to a first embodiment of the present invention.

EXPLANATIONS OF LETTERS OR NUMERALS 10A to 10E combustion burner
11-1 to 11-3 multi-purpose injecting hole
12 liquid fuel tank
13 gas fuel tank
14 water tank
15A to 15C water film
16A, 16B-1 to 16B-3 water injecting hole
17 static mixer
18A to 18E atomized mixed fuel
21 water cooling circuit 110 fuel nozzle
111 air passage
120 burner tube
121 clearance
130 swirler vane
131 clearance setting rib
132a vane pressure surface
132b vane suction surface
133A, 133B, 133C-1 to 133C-3 liquid fuel injecting holes
200 pilot combustion burner
A compressed air
a swirling air flow
W water
GF gas fuel
LF liquid fuel
MF mixed fuel
L11 liquid fuel supplying line
L21 to L23 gas fuel supplying lines
L31 to L33 water supplying lines
$V_{11}$, $V_{21}$ to $V_{23}$, $V_{31}$ to $V_{33}$ valve

BEST MODE(S) FOR CARRYING OUT THE INVENTION

The present invention will now be explained in detail with reference to the attached drawings. The embodiments disclosed herein are not intended to limit the scope of the present invention in any way. Furthermore, elements disclosed in the embodiment include those that can be easily imagined by those in the art, or those that are substantially identical.

First Embodiment

A combustion burner according to a first embodiment of the present invention will now be explained with reference to some of the attached drawings.

FIG. 1 is a schematic of a structure of the combustion burner according to the first embodiment of the present invention.

Figure 9:
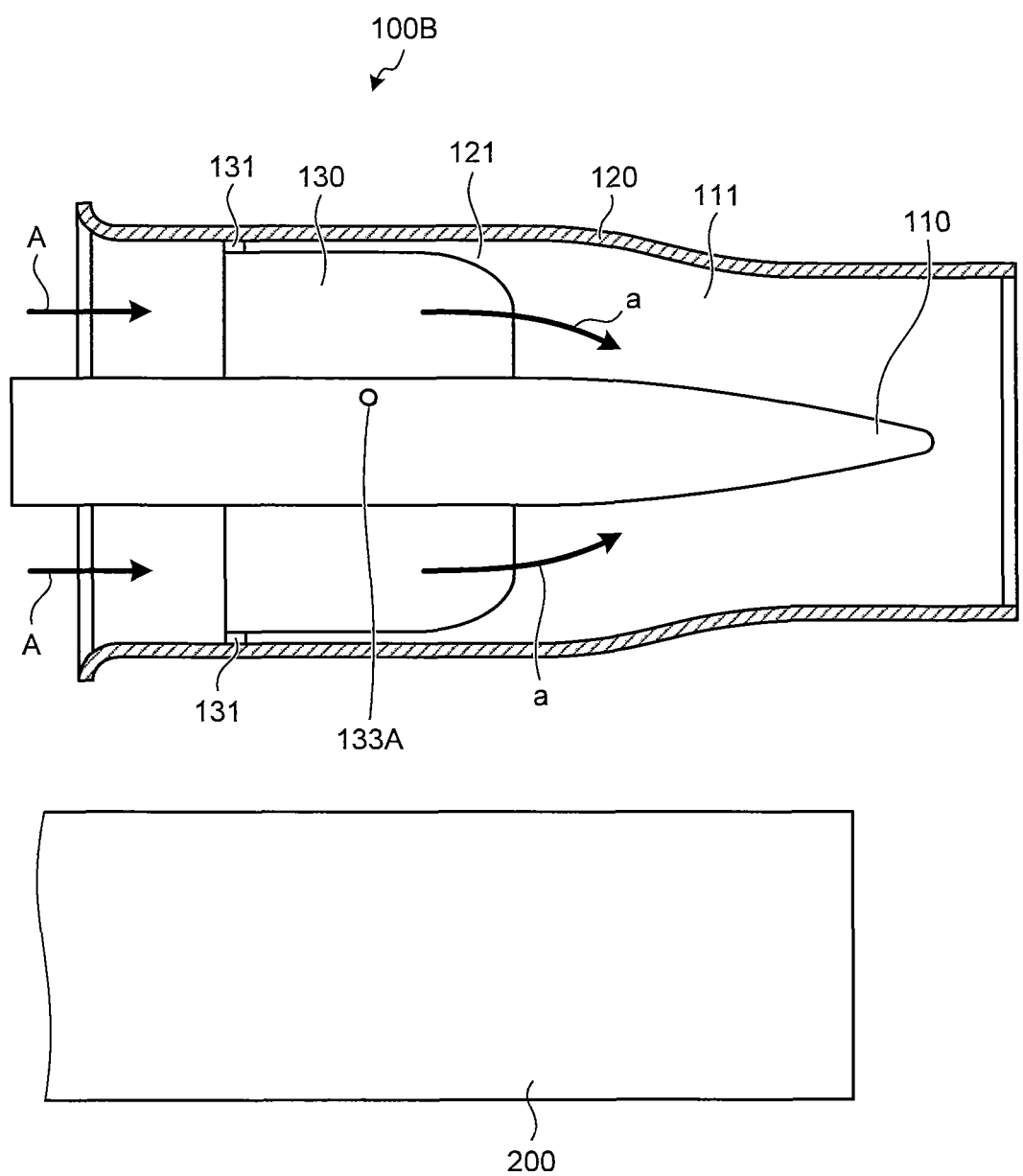
FIG. 9 is a schematic of an exemplary structure of another conventional combustion burner.
Figure 10:
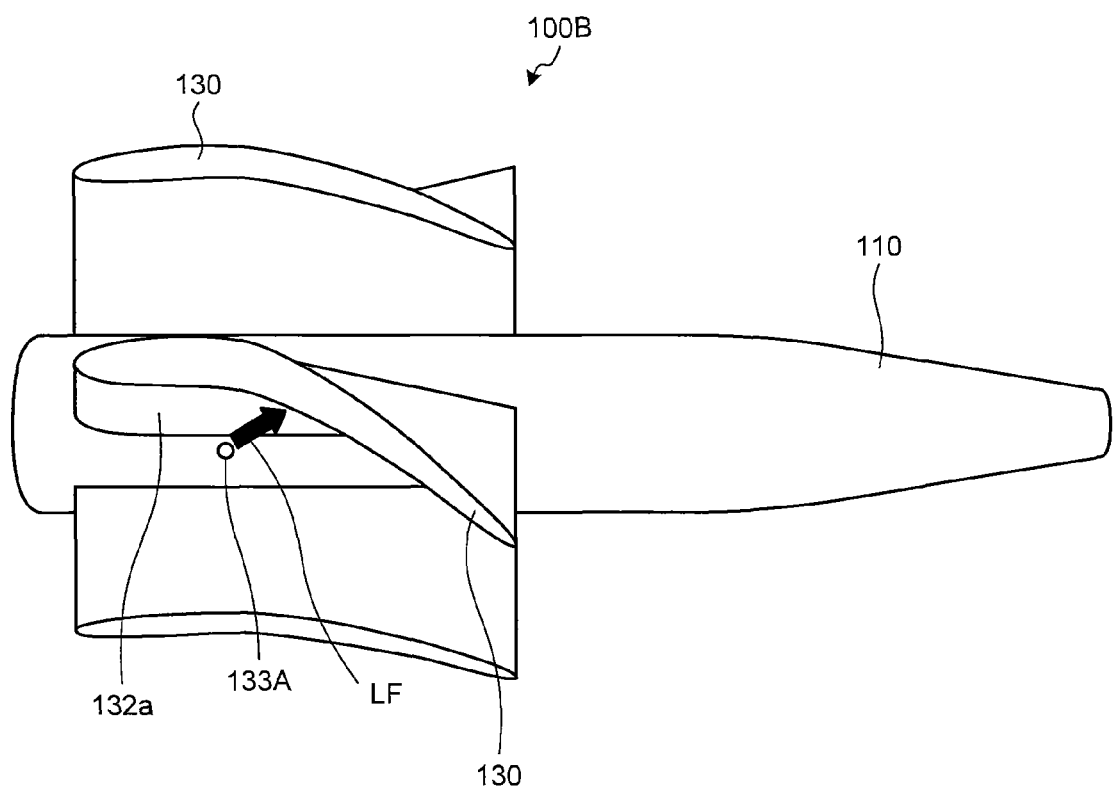
FIG. 10 is a perspective view of a combustion nozzle included in the conventional combustion burner.

In FIG. 1, elements that are the same as those shown in FIGS. 8 to 10 are given the same reference numerals, and redundant explanations thereof are omitted.

As shown in FIG. 1, a combustion burner 10A according to the present embodiment includes: the fuel nozzle 110; the burner tube 120 surrounding the fuel nozzle 110 to form the air passage 111 between the burner tube 120 and the fuel nozzle 110; the swirler vanes (swirler vanes) 130 arranged in a plurality of positions in the circumferential direction on the external circumferential surface of the fuel nozzle 110, each extending along the axial direction of the fuel nozzle 110, and gradually curving from upstream to downstream of an air that flows through the air passage 111 so as to swirl the air flowing from the upstream to the downstream; the liquid fuel injecting hole 133A that is arranged on the fuel nozzle 110, and through which the liquid fuel LF is injected to a surface of each of the swirler vanes 130; and a cooling unit that cools a part of the vane surface on which the liquid fuel LF hits.

The cooling unit according to the present embodiment is arranged on the vane pressure surface 132a of the swirler vane 130. Upon combusting a gas fuel GF (during gas firing), the gas fuel GF is injected; and upon combusting liquid fuel LF (during oil firing), water W is injected to the vane pressure surface 132a of the swirler vane 130. In other words, the cooling unit includes multi-purpose injecting holes 11-1 to 11-3 through which not only a gas fuel but also water is injected to cool the vane pressure surface 132a while the water is injected (details thereof are to be described later).

The burner tube 120 is arranged along the same axis as the fuel nozzle 110, surrounding the fuel nozzle 110. Therefore, the ring-like air passage 111 is formed between the external circumferential surface of the fuel nozzle 110 and the inner circumferential surface of the burner tube 120. The compressed air A flows through the air passage 111 from the upstream (the left-hand side in FIG. 1) to the downstream of the air passage 111 (the right-hand side in FIG. 1).

The swirler vanes 130 are arranged in a plurality of positions in the circumferential direction of the fuel nozzle 110, extending along the axial direction of the fuel nozzle 110. Each of the swirler vanes 130 gives a swirling force to the compressed air A that flows through the air passage 111 to obtain a swirling air flow a. To achieve this goal, each of the swirler vanes 130 is gradually curved from the upstream to the downstream (inclined in the circumferential direction) so that the swirler vane 130 can swirl the compressed air A.

In other words:
(1) each of the swirler vanes 130 is gradually curved from the upstream to the downstream so that the swirler vane 130 can swirl the compressed air A;
(2) the degree of the curve in the axial direction (the longitudinal direction of the fuel nozzle 110) is increased from the upstream to the downstream; and
(3) in the rear edge of the swirler vane 130, the degree of the curve in the radial direction (the radial (radiating) direction of the fuel nozzle 110) is increased toward the external circumferential direction than that toward internal circumferential direction.

The clearance (gap) 121 is kept between the end surface (tip) of the external circumference of each of the swirler vanes 130 and the inner circumferential surface of the burner tube 120. A positive pressure is applied to the vane pressure surface 132a (see FIG. 2) of the swirler vane 130, and a negative pressure is applied onto a vane suction surface 132b (see FIG. 2) of the swirler vane 130; that is, there is a pressure difference between the pressure on the vane suction surface 132b and the pressure on the vane pressure surface 132a. Therefore, a leaking air flow, flowing around the vane pressure surface 132a to the vane suction surface 132b, is generated through the clearance 121. This leaking flow interferes with the compressed air A flowing through the air passage 111 along the axial direction, to generate a vortical air flow. By way of such a vortical air flow, the air is effectively mixed with the fuel that is injected to the vane pressure surface 132a through the liquid fuel injecting holes 133A, making the fuel vaporized and atomized, and making the gas fuel GF uniform.

The clearance setting rib 131 is fixed on a front-side end surface (tip) of the external circumference of each of the swirler vanes 130. The height (radial length) of each of the clearance setting ribs 131 is set so that, when the fuel nozzle 110 having the swirler vanes 130 is assembled to the burner tube 120, each of the clearance setting ribs 131 is brought in a close contact with the internal circumferential surface of the burner tube 120.

Therefore, the length (radial length) of each of the clearances 121, formed between each of the swirler vanes 130 and the burner tube 120, will be equal. Furthermore, the fuel nozzle 110 having the swirler vanes 130 can easily be assembled into the burner tube 120.

The fuel nozzle 110 is formed with a plurality of the liquid fuel injecting holes 133A for injecting and spraying a fuel onto the vane pressure surface 132a. In the combustion burner 10A according to the present embodiment, the liquid fuel injecting holes 133A are arranged on the fuel nozzle 110. Each of the liquid fuel injecting holes 133A is arranged at a position near the vane pressure surface 132a of each of the swirler vanes 130, on the external circumference of the fuel nozzle 110.

A liquid fuel supplying line L11 is formed in the fuel nozzle 110. The liquid fuel LF is supplied from a liquid fuel tank 12 to each of the liquid fuel injecting holes 133A via the liquid fuel supplying line L11. At this time, the amount of the supplied liquid fuel LF is adjusted with a valve V11.

In the present embodiment, the position and the orientation of each of the liquid fuel injecting holes 133A are set so that the liquid fuel LF injected through each of the liquid fuel injecting holes 133A is sprayed to the vane pressure surface 132a of each of the swirler vanes 130. Because the degree of the curve of the vane pressure surface 132a is increased toward the external circumferential direction from the internal circumferential direction (toward the radiating direction), the liquid fuel LF can be sprayed to the vane pressure surface 132a to spread the liquid fuel LF into a thin film on the vane pressure surface 132a, simply by injecting the liquid fuel LF through each of the liquid fuel injecting holes 133A in the radial direction (radiating direction).

The liquid fuel LF, spread into a thin film on the vane pressure surface 132a, is brought in contact with the compressed air A (or the swirling air flow a) that is an air flow at a high temperature and a high speed to become vaporized. In other words, the liquid fuel LF, spread into a thin film on the vane pressure surface 132a, is peeled off and vaporized by way of a shearing force produced by a steep airflow boundary layer velocity gradient on the vane pressure surface 132a.

The liquid fuel LF that is spread into a thin film is vaporized as mentioned above; however, the liquid fuel LF that is not completely vaporized spreads out on the vane pressure surface 132a and moves from the front end toward the rear end of the vane. The liquid fuel LF that has spread into a thin film and reached the rear end of the vane is peeled off of the rear end and becomes atomized by way of the high-speed compressed air A (the swirling air flow a). At this time, because the thickness of the thin liquid fuel LF is extremely small, the diameter of the atomized liquid fuel LF will also be extremely small. Because the liquid fuel LF, atomized to have extremely small diameter, is mixed with the swirling air flow a (including the vortical air flow), vaporization thereof is further promoted.

In this manner, the liquid fuel LF is injected to the vane pressure surface 132a to promote atomization, vaporization, and gasification of the liquid fuel LF. The liquid fuel LF atomized to have extremely small particle diameter and vaporized is mixed with air and combusted. Therefore, good combustion can be achieved.

Furthermore, in the combustion burner 10A according to the present embodiment, the multi-purpose injecting holes 11-1 to 11-3 are arranged on the vane pressure surface 132a of the swirler vane 130. The multi-purpose injecting holes 11-1 to 11-3 inject the gas fuel GF during the gas firing, and inject the water W to the vane pressure surface 132a of the swirler vane 130 while the liquid fuel LF is being combusted (during oil firing).

During the gas firing, the gas fuel GF is supplied from a gas fuel tank 13 to the multi-purpose injecting holes 11-1 to 11-3 via gas fuel supplying lines L21 to L23. The supplied gas fuel GF is injected through the multi-purpose injecting holes 11-1 to 11-3 to the vane pressure surface 132a of the swirler vane 130. The amount of the supplied gas fuel GF is controlled by valves $V_{21}$ to $V_{23}$.

Therefore, during the gas firing, the gas fuel GF can be injected through the injecting holes 11-1 to 11-3. At the same time, the liquid fuel LF can be injected through the liquid fuel injecting holes 133A to the vane pressure surface 132a to obtain a dual firing gas turbine that combusts the gas fuel GF and the liquid fuel LF simultaneously.

When only the liquid fuel LF is combusted, the water W is supplied from the a water tank 14 via water supplying lines L31 to L33, and the supplied water W is injected to the vane pressure surface 132a of the swirler vane 130 through the multi-purpose injecting holes 11-1 to 11-3. The amount of the supplied water W is adjusted with valves $V_{31}$ to $V_{33}$.

Figure 2:
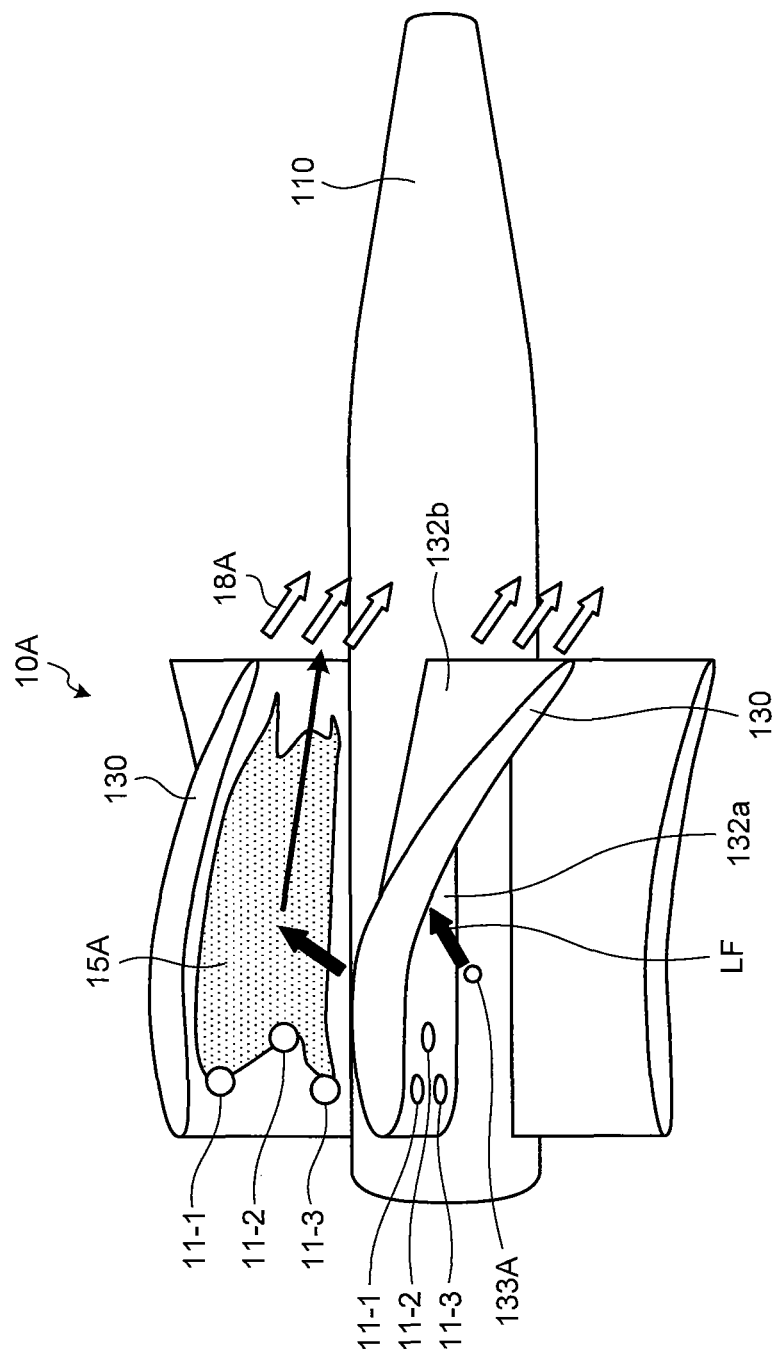
FIG. 2 is a perspective view of the combustion burner according to the first embodiment, injecting water while only the liquid fuel LF is combusted.

FIG. 2 is a perspective view of the combustion burner according to the first embodiment, injecting water while only the liquid fuel LF is combusted. As shown in FIG. 2, while the liquid fuel LF is combusted, the water W, supplied from the water tank 14 via the water supplying lines L31 to L33, forms a water film 15A on the surface of the vane pressure surface 132a of each of the swirler vanes 130.

The water W, injected through the multi-purpose injecting holes 11-1 to 11-3 and formed into the water film 15A, is mixed with the liquid fuel LF injected through each of the liquid fuel injecting holes 133A, and atomized at the tip of the vanes, and an atomized mixed fuel 18A flies apart toward downstream of the air passage 111.

In this manner, during the oil firing, because the water W is supplied through the multi-purpose injecting holes 11-1 to 11-3 to form the water film 15A on the vane surface, it is possible to cool the part of the vane pressure surface 132a on which the liquid fuel LF hits. In this manner, formation of carbon deposit can be prevented.

Furthermore, because the multi-purpose injecting holes 11-1 to 11-3 are used as water supply holes for supplying the water W, fluid channels provided in the fuel nozzle 110 can be prevented from being complex in shape.

Further more, by simply applying the gas fuel injecting holes to an existing combustion burner with an addition of the water supply lines, the water W can be injected to the vane pressure surface 132a of each of the swirler vanes 130 and the formation of the carbon deposit can be prevented.

Furthermore, because the combustion temperature can be reduced by way of the water W supplied through the multi-purpose injecting holes 11-1 to 11-3, $NO_x$ in the combustion field can be reduced.

In the combustion burner 10A according to the present embodiment, the liquid fuel LF and the water W are introduced after a pilot nozzle, not shown, raises the load and then the pilot ratio is reduced. This is because, if the water W is introduced while the liquid fuel LF is injected, the amount of the water W will become relatively greater. Therefore, the water W needs to be introduced after the load is raised to a certain level.

In the combustion burner 10A according to the present embodiment, the water W is supplied intermittently after the pilot nozzle, not shown, raises the load; however, the present invention is not limited thereto, and the water W may be continuously supplied and mixed with the liquid fuel LF even before the pilot nozzle raises the load.

Figure 3:
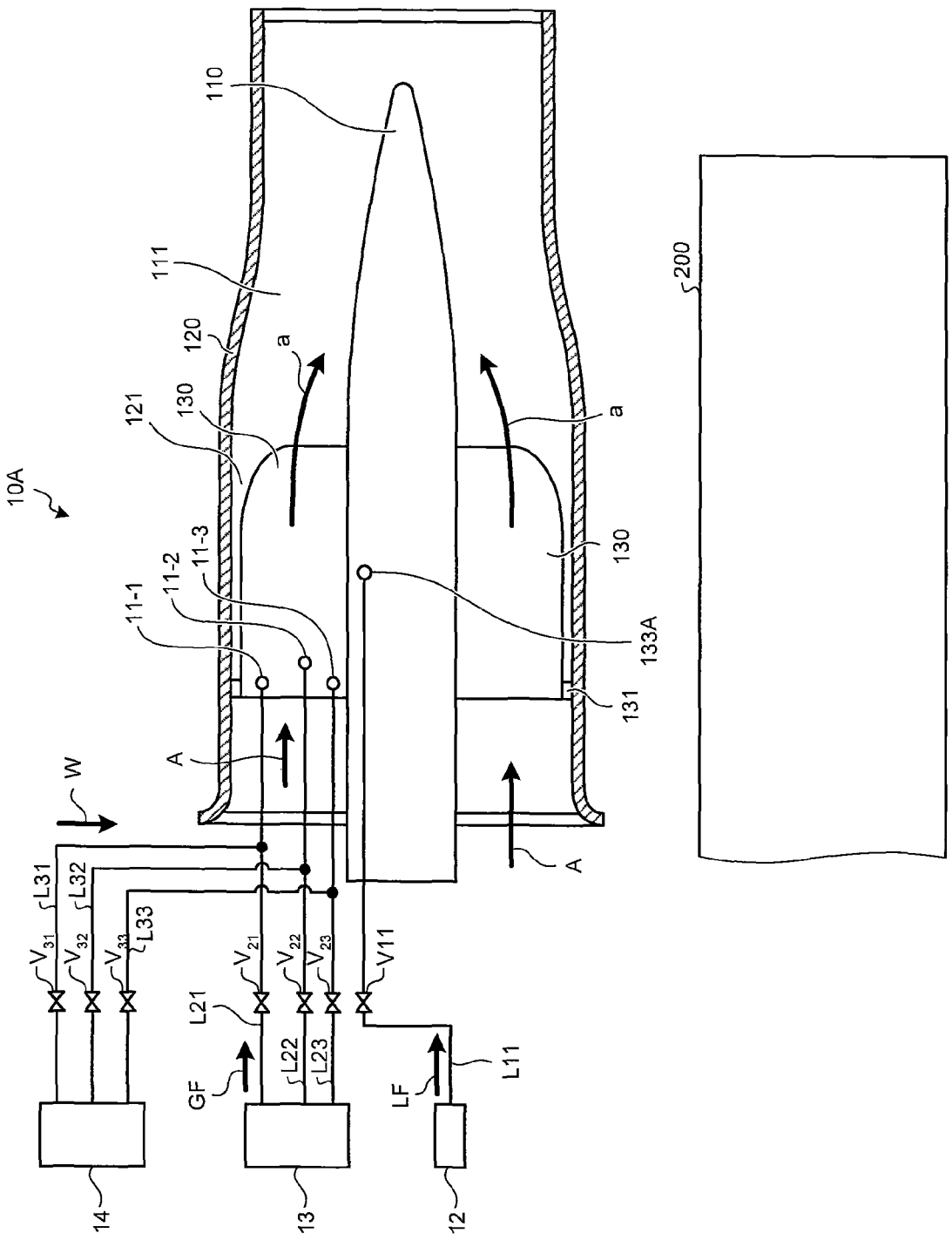
FIG. 3 is a schematic of another structure of the combustion burner according to the first embodiment.

Furthermore, in the combustion burner 10A according to the present embodiment, the gas fuel supplying lines L21 to L23 for supplying the gas fuel GF from the gas fuel tank 13 is provided separately from the water supplying lines L31 to L33 for supplying the water W from the water tank 14, to inject either the gas fuel GF or the water W through the multi-purpose injecting holes 11-1 to 11-3; however, the present invention is not limited thereto, and the gas fuel supplying lines L21 to L23 and the water supplying lines L31 to L33 may be connected in between, as shown in FIG. 3, to supply either the gas fuel GF or the water W through the multi-purpose injecting holes 11-1 to 11-3.

Furthermore, in the combustion burner 10A according to the present embodiment, the liquid fuel LF is injected to the vane pressure surface 132a of the swirler vane 130 through the liquid fuel injecting holes 133A; however, the present invention is not limited thereto, and the liquid fuel LF may be injected to the vane suction surface 132b of the swirler vane 130 through the liquid fuel injecting holes 133A. Alternatively, the liquid fuel LF may be injected to both of the vane pressure surface 132a and the vane suction surface 132b of the swirler vane 130, through the liquid fuel injecting holes 133A.

As described above, the combustion burner 10A according to the present embodiment includes the multi-purpose injecting holes 11-1 to 11-3 that are arranged on the vane pressure surface 132a of the swirler vane 130 and are commonly used for injecting the water and for injecting the gas fuel, to inject the water W to the vane pressure surface 132a of the swirler vanes 130 during a combustion in which only the liquid fuel LF is used, and to inject the gas fuel GF during the gas firing operation. Therefore, the water film 15A is formed on the vane pressure surface 132a of the swirler vane 130 to cool the part of the vane pressure surface 132a on which the liquid fuel LF hits. In this manner, it is possible to suppress heating of the part of the vane pressure surface 132a on which the liquid fuel LF hits. Therefore, the combustion temperature can be reduced, to prevent a formation of carbon deposit, as well as to reduce $NO_x$ in the combustion field.

Second Embodiment

A combustion burner according to a second embodiment of the present invention will now be explained with reference to FIG. 4.

The combustion burner according to the present embodiment has almost the same structure as that of the combustion burner 10A according to the first embodiment shown in FIG. 1; therefore, the same reference numerals are given to the elements that are same as those in the combustion burner 10A shown in FIG. 1, and redundant explanations thereof are omitted.

In the present embodiment, only the combustion nozzle 110 and the swirler vanes 130 are described and the other elements are omitted. The same can be said in the remaining embodiments.

Figure 4:
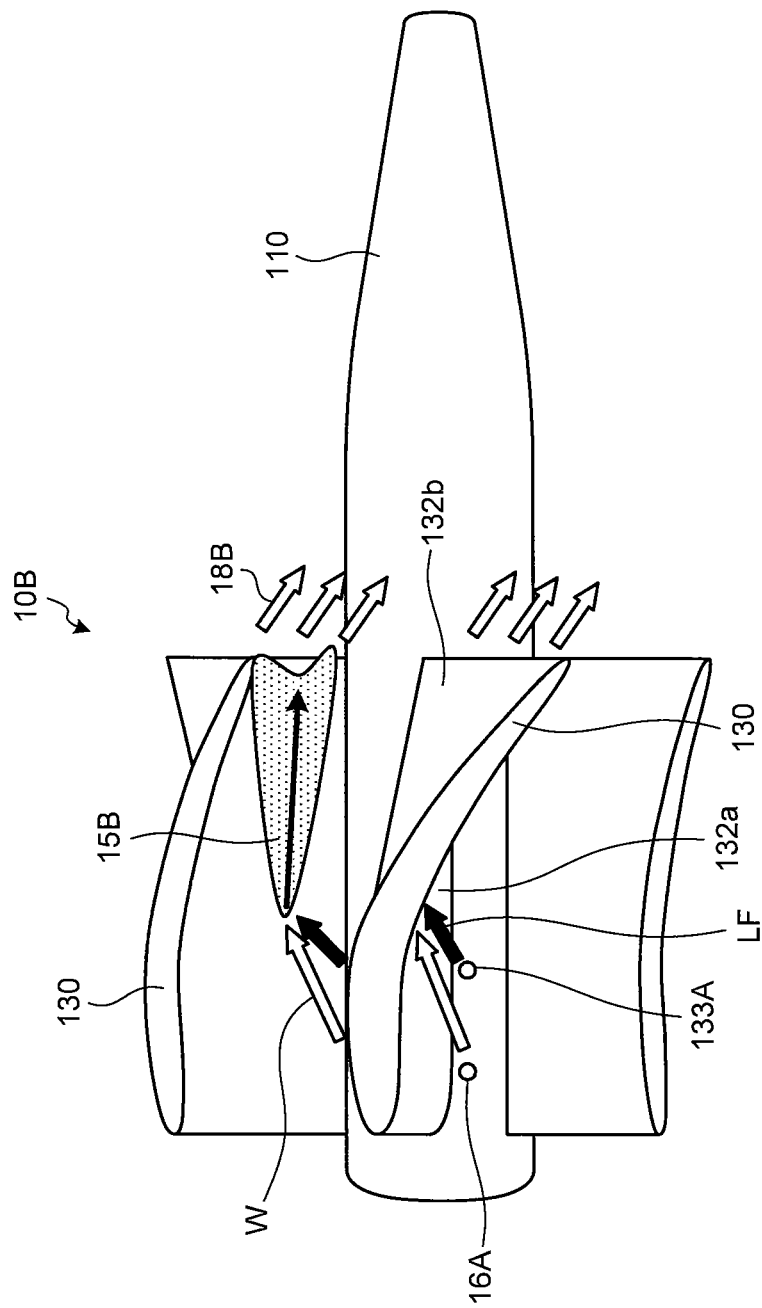
FIG. 4 is a schematic of a structure of a combustion burner according to a second embodiment of the present invention.

FIG. 4 is a schematic of a structure of the combustion burner according to the second embodiment of the present invention.

As shown in FIG. 4, in a combustion burner 10B according to the present embodiment, the multi-purpose injecting holes 11-1 to 11-3, which are arranged on the vane pressure surface 132a of the swirler vane 130 in the combustion burner 10A according to the first embodiment, are now arranged on the fuel nozzle 110 too, each in line with each of the liquid fuel injecting holes 133A along the axial direction.

In other words, the combustion burner 10B according to the present embodiment includes, as the cooling unit, independent water injecting holes 16A each of which is arranged on the fuel nozzle 110 too in line with each of the liquid fuel injecting holes 133A at a position upstream of each of the liquid fuel injecting holes 133A along the axial direction, and from which the water W is injected to the vane pressure surface 132a of each of the swirler vanes 130.

FIG. 4 is a schematic indicating where the water is injected.

Each of the water injecting holes 16A is arranged on the fuel nozzle 110 at a position upstream of each of the liquid fuel injecting holes 133A in line therewith to inject the water W to the vane pressure surface 132a of the swirler vanes 130. The water W is injected through the water injecting holes 16A to the part of the vane pressure surface 132a of the swirler vane 130 on which the liquid fuel LF hits, to form a water film 15B on the vane pressure surface 132a of the swirler vane 130. The water W injected through the water injecting holes 16A and is formed into the water film 15B is mixed with the liquid fuel LF injected through each of the liquid fuel injecting holes 133A, and is atomized at the tip of the swirler vane 130. An atomized mixed fuel 18B flies apart downstream of the air passage 111 shown in FIG. 1.

In this manner, the water W is supplied through the water injecting holes 16A to form the water film 15B on the vane pressure surface 132a. The water film 15B cools the part of the vane pressure surface 132a on which the liquid fuel LF hits to reduce the temperature on the vane surface. Therefore, the combustion temperature can be reduced, to prevent formation of carbon deposit.

Third Embodiment

A combustion burner according to a third embodiment of the present invention will now be explained with reference to FIG. 5.

The combustion burner according to the present embodiment has almost the same structure as that of as the combustion burner 10A according to the first embodiment shown in FIG. 1; therefore, the same reference numerals are given to the elements that are same as those in the combustion burner 10A shown in FIG. 1, and redundant explanations thereof are omitted.

In the third embodiment, only the combustion nozzle 110 and the swirler vanes 130 are described, and the other elements are omitted.

Figure 5:
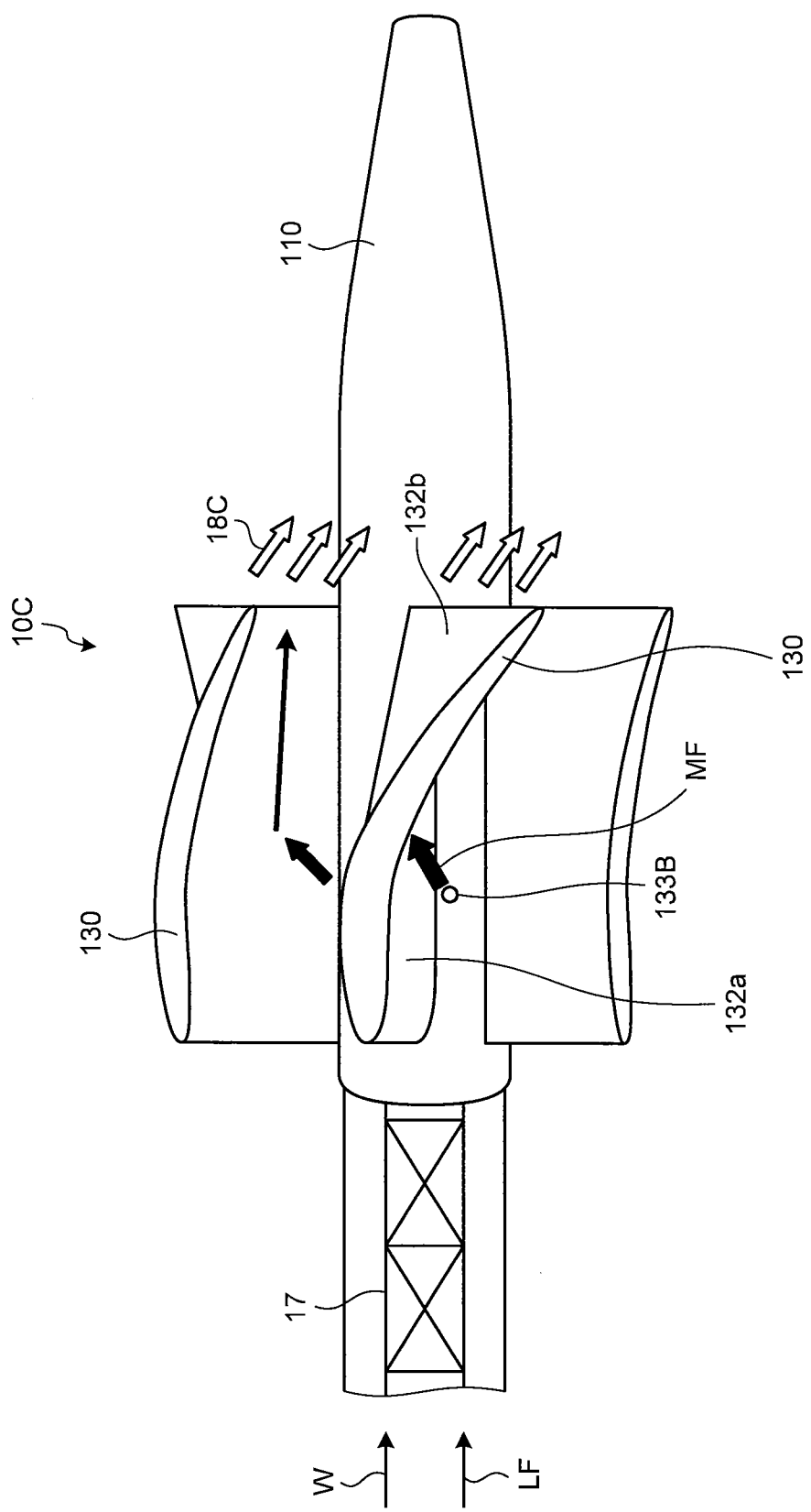
FIG. 5 is a schematic of a structure of a combustion burner according to a third embodiment of the present invention.

FIG. 5 is a schematic of a structure of the combustion burner according to the third embodiment of the present invention.

As shown in FIG. 5, in a combustion burner 10C according to the present embodiment, the multi-purpose injecting holes 11-1 to 11-3, which are arranged on the vane pressure surface 132a of the swirler vanes 130 in the combustion burner 10A according to the first embodiment shown in FIG. 1, and the liquid fuel injecting holes 133A are now combined.

In other words, the combustion burner 10C according to the present embodiment injects a mixed fuel MF prepared by mixing the water W and the liquid fuel LF evenly to the vane pressure surface 132a of each of the swirler vanes 130 through liquid fuel injecting holes 133B, as the cooling unit.

In the combustion burner 10C according to the present embodiment, the fuel nozzle 110 includes a static mixer 17 for mixing the water W and the liquid fuel LF homogeneously. The mixed fuel MF prepared by mixing the water W and the liquid fuel LF evenly in the static mixer 17 is gushed out of the liquid fuel injecting holes 133B.

In a conventional combustion burner, when the water W and the liquid fuel LF are mixed using the static mixer 17, for example, the water W and the liquid fuel LF are mixed at a position further upstream in the fuel nozzle 110.

Therefore, there are situations where the water W and the liquid fuel LF become separated while passing through the fuel nozzle 110.

On the contrary, in the combustion burner 10C according to the present embodiment, the static mixer 17 mixes the water W and the liquid fuel LF at a position immediately near the liquid fuel injecting holes 133B, the mixed fuel MF can be gushed out of the liquid fuel injecting hole 133B without permitting the water W and the liquid fuel LF to become separated. The mixed fuel MF injected through each of the liquid fuel injecting holes 133B is atomized at the tip of each of the vanes, and an atomized mixed fuel 18C flies apart toward downstream of the air passage 111 such as the one shown in FIG. 1.

The water W is added to the liquid fuel LF in a liquid fuel supplying line L31 that is similar to the one shown in FIG. 1. Because the boiling temperature of the water W is lower than that of the liquid fuel LF such as oil, the water W becomes vaporized first to reduce the combustion temperature to deprive temperature from the surface of the swirler vanes 130. Therefore, formation of carbon deposit can be prevented.

Furthermore, in the combustion burner 10C according to the present embodiment, it is not necessary to provide the multi-purpose injecting holes 11-1 to 11-3 such as those provided on the combustion burner 10A according to the first embodiment shown in FIG. 1, and the water W is only gushed out of the liquid fuel injecting holes 133B. Therefore, it is possible to reduce the number of injecting holes arranged on the fuel nozzle 110 or the swirler vanes 130.

In the combustion burner 10C according to the present embodiment, the static mixer 17 mixes the water W and the liquid fuel LF evenly; however, the present invention is not limited thereto, and anything can be used as long as the water W and the liquid fuel LF can be mixed evenly.

Fourth Embodiment

A combustion burner according to a fourth embodiment of the present invention will now be explained with reference to FIG. 6.

The combustion burner according to the present embodiment has almost the same structure as that of the combustion burner 10A according to the first embodiment shown in FIG. 1; therefore, the same reference numerals are given to the elements that are same as those in the combustion burner 10A shown in FIG. 1, and redundant explanations thereof are omitted.

In the present embodiment, only the combustion nozzle 110 and the swirler vanes 130 are described, and the other elements are omitted.

Figure 6:
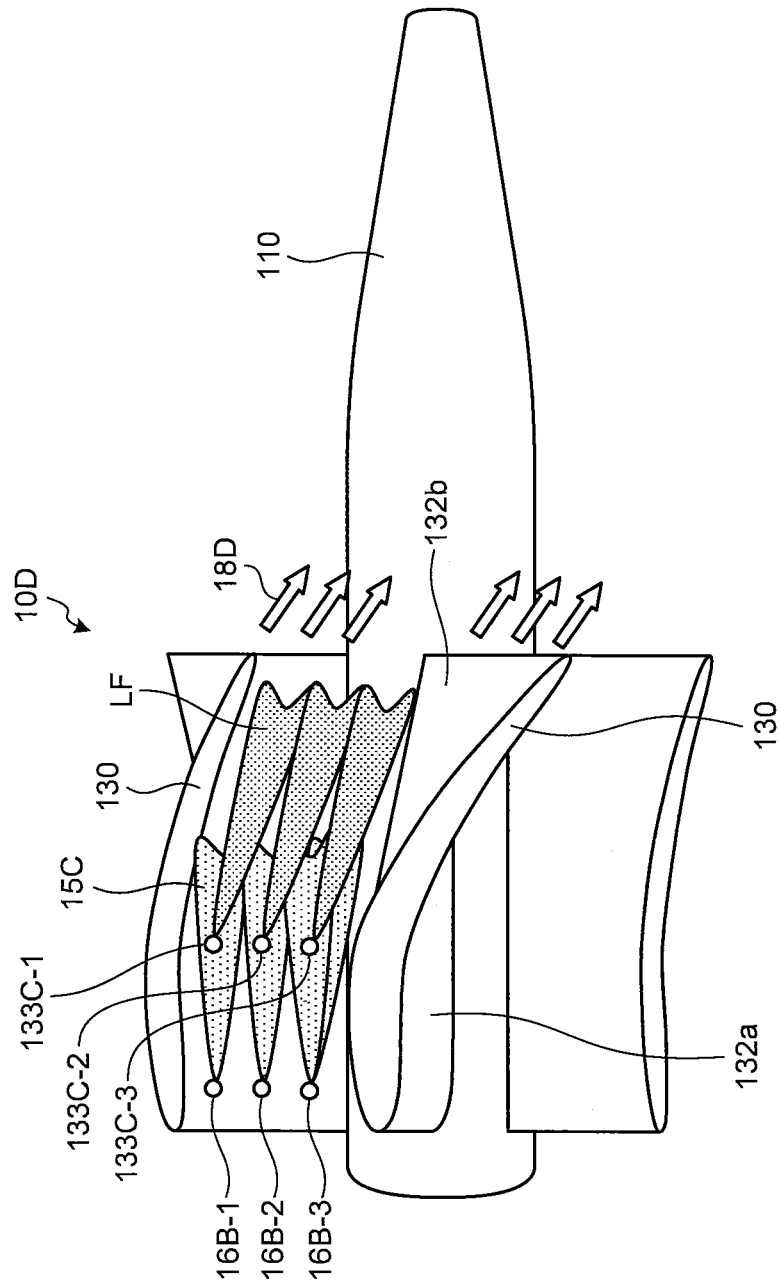
FIG. 6 is a schematic of a structure of a combustion burner according to a fourth embodiment of the present invention.

FIG. 6 is a schematic of a structure of the combustion burner according to the fourth embodiment of the present invention.

As shown in FIG. 6, in the combustion burner 10D according to the present embodiment, the liquid fuel injecting holes 133A, which are arranged on the fuel nozzle 110 in the combustion burner 10A according to the first embodiment shown in FIG. 1, are now arranged on the vane pressure surface 132a of the swirler vanes 130.

In other words, the combustion burner 10D according to the present embodiment includes, as the cooling unit, liquid fuel injecting holes 133C-1 to 133C-3 that are arranged on the vane pressure surface 132a of each of the swirler vanes 130, and water injecting holes 16B-1 to 16B-3 that are arranged upstream of the liquid fuel injecting holes 133C-1 to 133C-3 (the left-hand side in FIG. 6) on the vane pressure surface 132a of the swirler vane 130 for injecting the water W to the vane pressure surface 132a of the swirler vane 130.

FIG. 6 is a schematic indicating where the water is injected.

The water W is gushed out of the water injecting holes 16B-1 to 16B-3, arranged upstream on the vane pressure surface 132a of the swirler vane 130, to the vane pressure surface 132a of the swirler vane 130 to form a water film 15C on the surface of the vane pressure surface 132a of the swirler vane 130, to reduce the temperature at the vane surface of the swirler vane 130. The liquid fuel LF is injected through the liquid fuel injecting holes 133C-1 to 133C-3 arranged downstream of the water injecting holes 16B-1 to 16B-3. The water W, injected through each of the water injecting holes 16B-1 to 16B-3 and is formed into the water film 15C, and the liquid fuel LF, injected through each of the liquid fuel injecting holes 133C-1 to 133C-3, are mixed and become atomized at the tip of the vane. An atomized mixed fuel 18D flies apart toward the downstream of the air passage 111, such as the one shown in FIG. 1.

As described above, the water W is supplied from the water injecting holes 16B-1 to 16B-3, arranged upstream of the liquid fuel injecting holes 133C-1 to 133C-3, to form the water film 15C on the surface of the swirler vane 130. In this manner, the temperature on the vane pressure surface 132a of the swirler vane 130 can be reduced. Therefore, formation of carbon deposit can be prevented.

Furthermore, the concentration distribution can be finely adjusted by injecting the liquid fuel LF from a surface of the swirler vane 130 where carbon deposit is less likely to occur.

Fifth Embodiment

A combustion burner according to a fifth embodiment of the present invention will now be explained with reference to FIG. 7.

The combustion burner according to the present embodiment has almost the same structure as that of the combustion burner 10A according to the first embodiment shown in FIG. 1; therefore, the same reference numerals are given to the elements that are same as those in the combustion burner 10A shown in FIG. 1, and redundant explanations thereof are omitted.

In the present embodiment, only the combustion nozzle 110 and the swirler vanes 130 are described, and the other elements are omitted.

Figure 7:
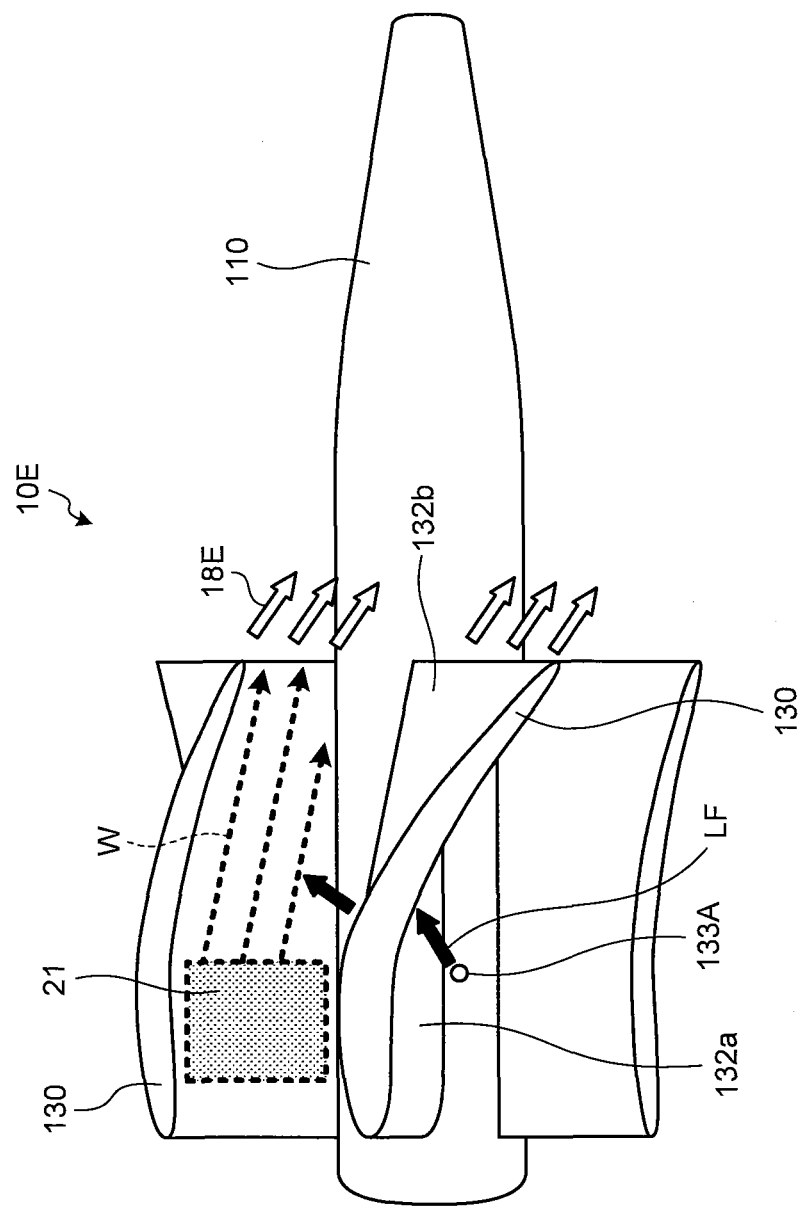
FIG. 7 is a schematic of a structure of a combustion burner according to a fifth embodiment of the present invention.

FIG. 7 is a schematic of a structure of the combustion burner according to the fifth embodiment of the present invention.

As shown in FIG. 7, in a combustion burner 10E according to the present embodiment, a water cooling circuit 21 is formed inside the swirler vane 130, instead of the multi-purpose injecting holes 11-1 to 11-3 arranged on the vane pressure surface 132a of the swirler vane 130 included in the combustion burner 10A according to the first embodiment shown in FIG. 1.

In other words, the combustion burner 10E according to the present embodiment includes, as the cooling unit, a water cooling circuit formed inside the swirler vane.

FIG. 7 is a schematic that indicates the water cooling circuit injecting water.

The water cooling circuit 21 is formed inside the swirler vane 130, and the inside of the swirler vane 130 is cooled by way of the water W flowing inside the swirler vane 130. The water W supplied to the water cooling circuit 21 is supplied via the water supplying line L31 such as the one shown in FIG. 1. The water W after cooling and being used in the water cooling circuit 21 is sprayed to the air passage 111 from the tip of the swirler vane 130 to become atomized.

The liquid fuel LF injected through the liquid fuel injecting holes 133A arranged on the fuel nozzle 110 becomes atomized. The atomized water and the atomized liquid fuel LF injected through each of the liquid fuel injecting holes 133A are mixed and atomized at the tip of the vane, and an atomized mixed fuel 18E flies apart toward the downstream of the air passage 111 such as the one shown in FIG. 1.

Therefore, by using the combustion burner 10E according to the fifth embodiment including the water cooling circuit 21 arranged inside the swirler vane 130 to cool the swirler vane 130 from its inside, the temperature on the surface of the swirler vane 130 can be reduced, thereby cooling the part of the vane pressure surface 132a on which the liquid fuel LF hits, thus preventing the swirler vanes 130 from being heated up. In this manner, the combustion temperature can be reduced. Therefore, formation of carbon deposit can be prevented more effectively.

Furthermore, the mixing of the water W, which is used in the water cooling circuit 21 and flies apart at the tip of the vane to become atomized, and the liquid fuel LF, which is injected through the liquid fuel injecting holes 133A to become atomized, can be promoted by way of swirls of the flows in downstream area.

INDUSTRIAL APPLICABILITY

As described above, the combustion burner according to the present invention can cool the part of the swirler vane surface on which the liquid fuel hits to suppress that part from being heated up. Therefore, the combustion burner according to the present invention is suited to be used as a combustion burner in a gas burner for suppressing carbon deposit formation.

The invention claimed is:

1. A combustion burner comprising:
    a fuel nozzle;
    a burner tube that surrounds the fuel nozzle to form an air passage between the burner tube and the fuel nozzle;
    a plurality of swirler vanes being arranged in a plurality of positions in a circumferential direction on an external circumferential surface of the fuel nozzle, each of which extends along an axial direction of the fuel nozzle, and gradually curves from upstream to downstream so as to swirl air flowing in the air passage from the upstream to the downstream;
    a liquid fuel injecting hole that is formed on the fuel nozzle, and from which a liquid fuel is injected to a vane pressure surface of each of the plurality of swirler vanes; and
    a cooling unit that cools a part of the vane pressure surface on which the liquid fuel hits;
    wherein the cooling unit includes multi-purpose injecting holes that are respectively arranged on the vane pressure surface of each of the plurality of swirler vanes, the multi-purpose injecting holes being configured to receive injected gas fuel during gas combustion, and being configured to receive water injected to the vane pressure surface of the plurality of swirler vanes during combustion of the liquid fuel.

* * * * *